US010062262B2

(12) United States Patent
Vitt et al.

(10) Patent No.: US 10,062,262 B2
(45) Date of Patent: Aug. 28, 2018

(54) PEOPLE METERING ENHANCED WITH LIGHT PROJECTION PROMPTING FOR AUDIENCE MEASUREMENT

(71) Applicant: The Nielsen Company (US), LLC, New York, NY (US)

(72) Inventors: James Joseph Vitt, Oldsmar, FL (US); Sachin Suresh Nilugal, Bangalore (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/400,731

(22) Filed: Jan. 6, 2017

(65) Prior Publication Data

US 2018/0137740 A1    May 17, 2018

(30) Foreign Application Priority Data

Nov. 16, 2016 (IN) .............................. 201611039061

(51) Int. Cl.
*G08B 21/24* (2006.01)
*H04N 21/442* (2011.01)
*H04N 21/4223* (2011.01)
*G06G 1/04* (2006.01)

(52) U.S. Cl.
CPC ....... *G08B 21/24* (2013.01); *H04N 21/44218* (2013.01); *G06G 1/04* (2013.01); *H04N 21/4223* (2013.01)

(58) Field of Classification Search
None
See application file for complete search history.

(56) References Cited

U.S. PATENT DOCUMENTS

| 4,355,372 | A | 10/1982 | Johnson et al. |
| 4,978,303 | A | 12/1990 | Lampbell |
| 5,226,177 | A | 7/1993 | Nickerson |
| 5,373,315 | A | 12/1994 | Dufresne et al. |
| 5,412,720 | A | 5/1995 | Hoarty |
| 5,761,606 | A | 6/1998 | Wolzien |
| 6,467,089 | B1 | 10/2002 | Aust et al. |
| 7,587,728 | B2 | 8/2009 | Wheeler et al. |
| 8,225,342 | B2 | 7/2012 | Mears et al. |
| 9,016,909 | B2 | 4/2015 | Cave et al. |
| 2002/0059218 | A1 | 5/2002 | August et al. |
| 2006/0200841 | A1 | 9/2006 | Ramaswamy et al. |
| 2013/0050426 | A1* | 2/2013 | Sarmast .................. G01S 17/89 348/46 |

(Continued)

*Primary Examiner* — Leon-Viet Nguyen
(74) *Attorney, Agent, or Firm* — Hanley, Flight & Zimmerman, LLC

(57) ABSTRACT

Example methods, apparatus, systems and articles of manufacture (e.g., physical storage media) to implement people metering enhanced with light projection prompting for audience measurement are disclosed. Example metering methods disclosed herein include determining whether a meter is to enter a first prompting mode. Disclosed example metering methods also include, in response to determining the meter is to enter the first prompting mode, activating a light projector to project light onto an external surface of a display screen of a media device. Disclosed example metering methods further include, after the light projector is activated, deactivating the light projector in response to determining the meter is to exit the first prompting mode.

18 Claims, 8 Drawing Sheets

(56) References Cited

U.S. PATENT DOCUMENTS

| | | | |
|---|---|---|---|
| 2013/0265293 A1* | 10/2013 | Kanzaka | G03B 21/2026 345/212 |
| 2013/0270423 A1* | 10/2013 | Kawabata | G01J 1/44 250/208.2 |
| 2014/0168369 A1* | 6/2014 | Crane | H04N 13/0253 348/46 |
| 2014/0189720 A1* | 7/2014 | Terrazas | H04N 21/44218 725/12 |
| 2016/0142690 A1* | 5/2016 | Chien | H04N 9/3179 348/734 |
| 2016/0227287 A1 | 8/2016 | McKissick et al. | |

\* cited by examiner

PEOPLE METERING ENHANCED WITH LIGHT PROJECTION PROMPTING FOR AUDIENCE MEASUREMENT

FIELD OF THE DISCLOSURE

This disclosure relates generally to audience measurement and, more particularly, to people metering enhanced with light projection prompting for audience measurement.

BACKGROUND

Audience measurement systems typically include one or more site meters to monitor the media presented by one or more media devices located at a monitored site. Many such audience measurement systems also include one or more people meters to obtain information characterizing the composition(s) of the audience(s) in the vicinity of the media device(s) being monitored. Prior people meters generally fall into two categories, namely, active people meters or passive people meters. An active people meter obtains audience information by actively prompting an audience member to press an input key or otherwise enter information via the people meter. A passive people meter obtains audience information by passively monitoring the audience, usually by using facial recognition techniques to identify the individual audience members included in the audience.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
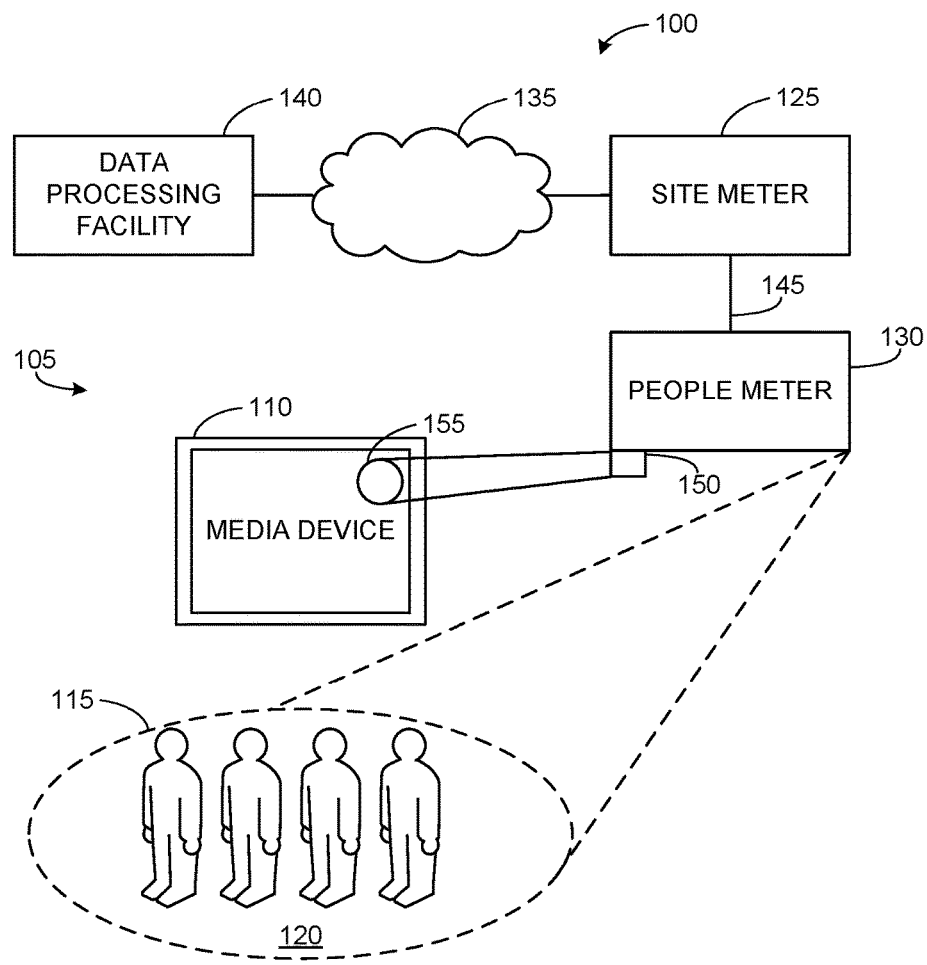
FIG. 1 is a block diagram of an example audience measurement system including an example site meter and an example enhanced people meter implementing people metering enhanced with light projection prompting in accordance with the teachings of this disclosure.

People metering enhanced with light projection prompting for audience measurement is disclosed herein. As noted above, prior people meters for audience measurement are generally either active or passive. An active people meter obtains audience information by actively prompting an audience to enter information for audience member identification. A passive people meter obtains audience information passively, usually by capturing images of the audience using a camera and then employing facial recognition to identify the individual audience members included in the audience. Active people meters are generally simpler and less costly than passive people meters, but are prone to measurement error due to audience fatigue over time, lack of audience compliance, etc. Passive people meters do not rely on audience compliance and, thus, can be more reliable, but also require substantially more computing resources to implement accurate facial recognition processing. The accuracy of the passive people meters may also depend on their cameras being properly positioned to capture images clearly depicting the faces of the audience members. As such, passive people meters are often too costly to deploy in a statistically significant number of monitored sites and/or are unable to be used in some sites to be monitored due to restrictions on camera placement.

In contrast, people metering examples for audience measurement disclosed herein employ active people metering with light projection prompting, which can improve audience compliance and, thus, audience measurement accuracy, but without incurring the costs associated with facial recognition techniques and/or other implementation aspects associated with passive people meters. Example people metering methods disclosed herein include determining whether a people meter is to enter a first prompting mode (e.g., such as a rude prompting mode, examples of which are described in further detail below). Disclosed example people metering methods also include, in response to determining the people meter is to enter the first prompting mode, activating a light projector to project light onto a surface, such as, but not limited to, an external surface of a display screen of a media device (e.g., such as a television, a computer, etc.) Disclosed example people metering methods further include, after the light projector is activated, deactivating the light projector in response to determining the people meter is to exit the first prompting mode. Projecting light onto the external surface the media device's display will degrade the presentation quality of the media being displayed by the media device until a user input is received. Thus, people metering with light projection prompting, as disclosed herein, improves audience compliance by encouraging audience members to respond to people meter prompts to stop the light projection onto the media device's screen and the associated degradation of the media presentation.

In some disclosed example people metering methods, the people meter is able to operate in the first prompting mode, a second prompting mode (e.g., a normal prompting mode, examples of which are described in further detail below) different from the first prompting mode, and a quiet mode. In some such examples, the people meter is to emit a first type of prompt while operating in the first prompting mode, the people meter is to emit a second type of prompt while operating in the second prompting mode, and the people meter is to perform no prompting while operating in the quiet mode. Some such disclosed example people metering methods also include activating the light projector while the people meter is operating in the first prompting mode, and not activating the light projector while the people meter is operating in the second prompting mode or the quiet mode. Furthermore, in some such disclosed example people metering methods, the people meter is to enter the quiet mode in response to detection of a user input while the people meter is operating in at least one of the first prompting mode or the second prompting mode, and the people meter is to enter the first prompting mode when no user input is detected after the people meter has operated in the second prompting mode for a first time period.

Additionally or alternatively, in some disclosed example people metering methods, the surface corresponds to an external surface of a display screen of a media device, and the light projector, when activated, is to project at least one of a white spot, a colored spot or a text message on the external surface of the display screen of the media device.

Additionally or alternatively, some disclosed example people metering methods further include controlling the light projector to project the light according to a first pulsing pattern having a first pulsing frequency after the light projector is activated. Some such disclosed example people metering methods also include controlling the light projector to project the light according a second pulsing pattern having a second pulsing frequency different than (e.g., higher than) the first pulsing frequency in response to determining a first time period has elapsed while the light projector remains activated. Additionally or alternatively, some such disclosed example people metering methods include controlling the light projector to at least one of change a color or change a projection area of the light in response to determining the first time period has elapsed while the light projector remains activated.

These and other example methods, apparatus, systems and articles of manufacture (e.g., physical storage media) to implement people metering enhanced with light projection prompting for audience measurement are disclosed in further detail below.

Turning to the figures, a block diagram of an example audience measurement system 100 employing people metering enhanced with light projection prompting for audience measurement in accordance with the teachings of this disclosure is illustrated in FIG. 1. The example audience measurement system 100 supports monitoring of media exposure to audiences at one or more monitored sites, such as the example monitored site 105 illustrated in FIG. 1. The monitored site 105 includes an example media device 110 and an example audience area 115. The audience area 115 corresponds to one or more locations at the monitored site 105 in which an audience 120 is expected to be present when consuming media (e.g., viewing and/or hearing the media, interacting with the media, etc.) presented by the media device 110. The audience area 115 can include, but is not limited to, a room containing the media device 110, a sitting area in front of the media device 110, etc. Although the example of FIG. 1 illustrates one monitored site 105, people metering enhanced with light projection prompting as disclosed herein can be used in audience measurement systems 100 supporting any number of monitored sites 105.

The audience measurement system 100 of the illustrated example includes an example site meter 125, also referred to as an example device meter 125, etc., to monitor media presented by the media device 110. To support people metering enhanced with light projection prompting at the monitored site 105 in accordance with the teachings of this disclosure, the example audience measurement system 100 of FIG. 1 also includes an example enhanced people meter 130, which is described in further detail below. In the illustrated example, the site meter 125 determines audience measurement data characterizing media exposure at the monitored site 105 by combining media metering data (also referred to as content metering data, content monitoring data, content measurement data, tuning data, etc.), which is determined by monitoring the media device 110, with audience identification data (also referred to as demographic data, people meter data, etc.), which is provided by the enhanced people meter 130. The site meter 125 then stores and reports this audience measurement data via an example network 135 to an example data processing facility 140. The data processing facility 140 performs any appropriate post-processing of the audience measurement data to, for example, determine audience ratings information, identify targeted advertising to be provided to the monitored site 105, etc. In the illustrated example, the network 135 can correspond to any type(s) and/or number of wired and/or wireless data networks, such as, but not limited to, the Internet, or any combination of networks thereof.

In the illustrated example, the media device 110 monitored by the site meter 125 can correspond to any type of audio, video and/or multimedia device capable of presenting media audibly and/or visually. As used herein, the term "media" includes any type of content and/or advertisement delivered via any type of distribution medium. Thus, media includes television programming or advertisements, radio programming or advertisements, movies, web sites, streaming media, etc. The example media device 110 of the illustrated example shown in FIG. 1 is a device that receives media from one or more media providers for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics.

For example, the example media device 110 can correspond an Internet-enabled television, a personal computer, an Internet-enabled mobile handset (e.g., a smartphone), a video game console (e.g., Xbox®, PlayStation®), a tablet computer (e.g., an iPad®), a digital media player (e.g., a Roku® media player, a Slingbox®, etc.), a radio, etc. In some examples, the media device 110 corresponds to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc.

The site meter 125 included in the audience measurement system 100 of the illustrated example can correspond to any type of metering device capable of monitoring media presented by the media device 110. As such, the site meter 125 may utilize invasive monitoring involving one or more physical connections to the media device 110, and/or non-invasive monitoring not involving any physical connection to the media device 110. For example, the site meter 125 may process audio signals obtained from the media device 110 via a microphone and/or a direct cable connection to detect media and/or source identifying audio codes and/or audio watermarks embedded in audio portion(s) of the media content presented by the media device 110. Additionally or alternatively, the site meter 125 may process video signals obtained from the media device 110 via a camera and/or a direct cable connection to detect content and/or source identifying video codes and/or video watermarks embedded in video portion(s) of the media content presented by the media device 110. Additionally or alternatively, the site meter 125 may process the aforementioned audio signals and/or video signals to generate respective audio and/or video signatures from the media presented by the media device 110, which can be compared to reference signatures to perform source and/or content identification. Any other type(s) and/or number of media content monitoring techniques can additionally or alternatively be supported by the site meter 125.

For example, audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). In some examples, to identify watermarked media, the watermark(s) are extracted by the example site meter 125 and used to access (e.g., at the data processing facility 140) a table of reference watermarks that are mapped to media identifying information Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves the example site meter 125 determining (e.g., generating and/or collecting) signature(s) representative of a media signal (e.g., an audio signal and/or a video signal) output by a monitored media device 110 and comparing the monitored signature(s) (e.g., at the data processing facility 140) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In the example of FIG. 1, the audience measurement system 100 includes the example enhanced people meter 130 to capture information about the audience 120 that is consuming the media presented by the media device 110. As described in further detail below, the enhanced people meter 130 of the illustrated example prompts the audience 120 to actively provide audience identification information via a user interface. For example, the enhanced people meter 130 may emit (e.g., audibly and/or visually) a prompting indicator during a current prompting interval. In such examples, the audience 120 can respond to the prompting indicator by using a user interface of the people meter 130 and/or a remote control device to identify which of a possible set of audience members are present in the audience 120.

In the illustrated example of FIG. 1, the site meter 125 triggers the enhanced people meter 130 via an example communication interface 145 to control the prompting intervals during which the enhanced people meter 130 is to prompt the audience 120 to actively provide audience identification information. For example, the site meter 125 causes the enhanced meter 130 to operate in one or more prompting modes to perform audience prompting based on, for example, a pre-configured prompting interval corresponding to a pre-configured prompting frequency, a prompting interval specified during configuration of the enhanced people meter 130 and corresponding to a specified prompting frequency, and/or based on monitored characteristics of the media being presented by the media device 110 (e.g., to cause prompting to occur upon detection of events, such as channel change events, content transition events, audio muting/un-muting events, etc.), etc.

For example, the enhanced people meter 130 (e.g., as triggered by the example site meter 125) may be configurable to operate in a normal prompting mode, a rude prompting mode and a quiet mode in which the enhanced people meter 130 performs no prompting. In some such examples, the enhanced people meter 130 operates in the quiet mode until being triggered to enter the normal prompting mode to begin a prompting interval. Then, when the enhanced people meter 130 is triggered (e.g., by the site meter 125) to begin a prompting interval, the enhanced people meter 130 enters the normal prompting mode (e.g., autonomously and/or based on control command/signal received from the site meter 125) to perform normal audience prompting. In the normal prompting mode, the enhanced people meter 130 emits a prompting indicator according to a first (e.g., normal) configuration to indicate that members of the audience 120 should provide user input(s) to register their presence with the people meter 130. For example, the first configuration may cause the enhanced people meter 130 to activate a visual indicator, such as one or more lamps, light emitting diodes (LEDs) etc., and/or present a text/graphics message via a liquid crystal display (LCD) and/or other display, at a first brightness, in a first color, according to a first (e.g., normal) visual pulsing pattern having a first (e.g., normal) visual repetition frequency, etc., to gain the attention of members of the audience 120 to prompt them to enter user input(s) to register with the people meter 130. Additionally or alternatively, the first configuration may cause the enhanced people meter 130 to activate an audible indicator, such as a tone and/or sound, etc., via one or more speakers at a first loudness/volume, according to a first (e.g., normal) audible pulsing pattern having a first (e.g., normal) audible repetition frequency, etc., to prompt them enter user input(s) to register with the people meter 130. In response to detecting one or more user inputs while operating in the normal prompting mode, the example enhanced people meter 130 (e.g., autonomously and/or as triggered by the example site meter 125) returns to the quiet mode to end user prompting until the next prompting interval.

However, if no user input is detected for a first (e.g., normal mode) time period (e.g., which may be user-configurable, predetermined, etc.), the enhanced people meter 130 is triggered to enter the rude prompting mode (e.g., autonomously based on expiration of an internal clock/timer, etc., and/or based on control command/signal received from the site meter 125) to perform rude audience prompting. In the rude prompting mode, the enhanced people meter 130 emits a prompting indicator according to a second (e.g., rude) configuration to indicate that members of the audience 120 should provide user input(s) to register their presence with the people meter 130. For example, the second configuration may cause the enhanced people meter 130 to activate a visual indicator, such as one or more lamps, LEDs, etc., and/or present a text/graphics message via an LCD and/or other display, at a second brightness (e.g., brighter than a the first brightness), in a second color (e.g., such as a color associated with a warning color) different from the first color, according to a second (e.g., rude) visual pulsing pattern different from the first pulsing pattern and having a second (e.g., rude) visual repetition frequency (e.g., which may be higher than the first visual repetition frequency), etc., to attempt to further gain the attention of members of the audience 120 to prompt them to enter user input(s) to register with the people meter 130. Additionally or alternatively, the second configuration may cause the enhanced people meter 130 to activate an audible indicator, such as a tone and/or sound, etc., via one or more speakers at a second loudness/volume (e.g., louder than the first loudness/volume), according to a second (e.g., rude) audible pulsing pattern different from the first pulsing pattern and having a second (e.g., rude) audible repetition frequency (e.g., which may be higher than the first audible repetition frequency), etc., to prompt them enter user input(s) to register with the people meter 130. In response to detecting one or more user inputs while operating in the rude prompting mode, or in response to expiration of a second (e.g., rude mode) time period, the example enhanced people meter 130 (e.g., autonomously and/or as triggered by the example site meter 125) returns to the quiet mode to end user prompting until the next prompting interval.

The example enhanced people meter 130 of FIG. 1 also includes an example light projector 150 to project light onto any surface, such as onto an external surface of a display screen of the media device 110 being monitored, and/or anywhere else. For example, the enhanced people meter 130 can use the light projector 150 to project light onto an area 155 of the external display surface of media device 110 when the enhanced people meter 130 is operating in one or more prompting modes (e.g., as triggered by the example site meter 125). As described above and in further detail below, in some examples, the enhanced people meter 130 (e.g., in combination with the site meter 125) can operate in different prompting modes, such as the normal prompting mode and the rude prompting mode described above and in further detail below, based on the responsiveness of the audience 120 to the prompting indicator(s) emitted by the enhanced people meter 130. In some examples, the enhanced people meter 130 activates the light projector 150 to project light onto the area 155 of the external display surface of media device 110 according to a first projection configuration in response to detecting (e.g., autonomously and/or based on control command/signal received from the site meter 125) that the enhanced people meter 130 is to enter the rude prompting mode, but not when the enhanced people meter is to enter/operate in the normal operating mode or the quiet mode. In some such examples, in the first projection configuration, the enhanced people meter 130 activates the light projector 150 to project light, such as a white spot, a colored spot, a text message, etc., onto the area 155 of the external display surface of media device 110 according to a first projection pulsing pattern having a first projection pulsing frequency after the light projector 150 is activated. In some such examples, the enhanced people meter 130 controls the light projector 150 according to a second projection configuration different from the first projection configuration in response to determining (e.g., autonomously based on an internal clock/time, and/or based on control command/signal received from the site meter 125) a first projection time period has elapsed while the light projector remains activated (e.g., when no user input has been detected during the first projection time period). In some examples, in the second projection configuration, the enhanced people meter 130 controls the light projector 150 according to a second projection pulsing pattern (e.g., different from the first projection pulsing pattern) having a second projection pulsing frequency (e.g., which is higher than the first projection pulsing frequency). Additionally or alternatively, in some such examples, in the second projection configuration, the enhanced people meter 130 controls the light projector 150 to at least one of change a color or change the projection area 155 of the light in response to determining (e.g., autonomously based on an internal clock/time, and/or based on control command/signal received from the site meter 125) the first projection time period has elapsed while the light projector remains activated. Then, the enhanced people meter 130 controls the light projector 150 to stop projecting light in response to, for example, determining (e.g., autonomously based on an internal clock/timer, and/or based on control command/signal received from the site meter 125) that a second projection time period has expired, or determining (e.g., autonomously and/or based on control command/signal received from the site meter 125) the people meter 130 has returned to the quiet mode (e.g., in response to a user input or expiration of the rude mode time period).

In other examples, the enhanced people meter 130 activates the light projector 150 to project light onto an area 155 of the external display surface of media device 110 in response to detecting (e.g., autonomously and/or based on control command/signal received from the site meter 125) that the enhanced people meter 130 is to enter any prompting mode, but not when the enhanced people meter is to enter/operate in the quiet mode. In some such examples, the enhanced people meter 130 controls the light projector 150 to project light onto the area 155 of the external display surface of media device 110 according to the first projection configuration described above in response to detecting (e.g., autonomously and/or based on control command/signal received from the site meter 125) that the enhanced people meter 130 is to enter the normal prompting mode. In some such examples, the enhanced people meter 130 controls the light projector 150 to project light onto the area 155 of the external display surface of media device 110 according to the second projection configuration described above in response to detecting (e.g., autonomously and/or based on control command/signal received from the site meter 125) that the enhanced people meter 130 is to enter the rude prompting mode. In some such examples, the enhanced people meter 130 controls the light projector 150 to stop projecting light in response to detecting (e.g., autonomously and/or based on control command/signal received from the site meter 125) that the enhanced people meter 130 is to enter the quiet mode.

Figure 2:
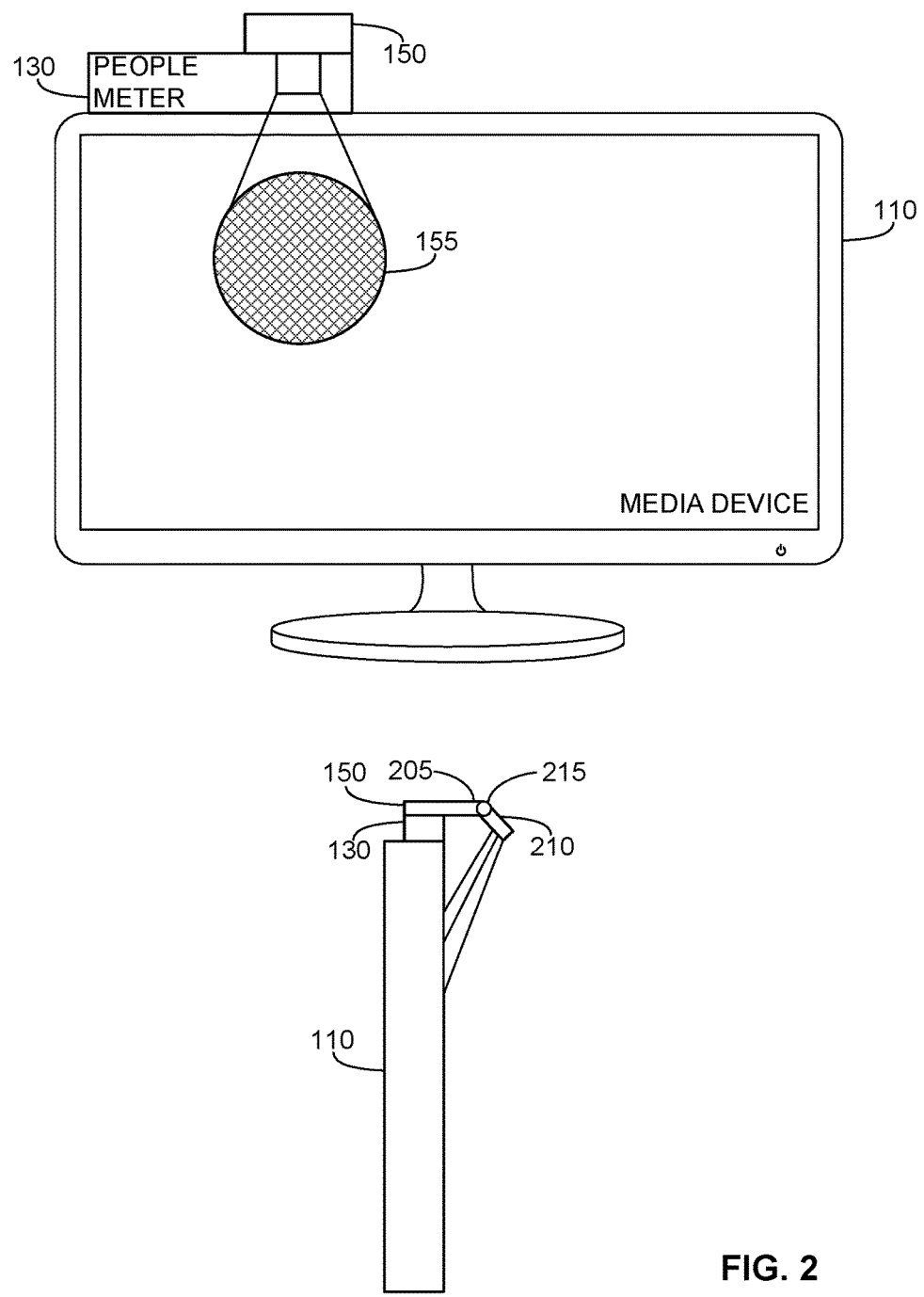
FIG. 2 illustrates front and side views of an example arrangement of an example media device and the example enhanced people meter of FIG. 1.

FIG. 2 illustrates front and side views of an example arrangement of the media device 110 and the example enhanced people meter 130 with the example light projector 150 of FIG. 1. In the illustrated example of FIG. 2, the enhanced people meter 130 is enclosed in an example housing structured to be positioned on top of the media device 110. In the illustrated example of FIG. 2, the light projector 150 is positioned on the top of the enhanced people meter 130 by being, for example, integrated into the enhanced people meter 130, affixed or otherwise coupled to the enhanced people meter 130, etc. As shown in the side view of the FIG. 2, the light projector 150 includes an example arm 205 and an example light source 210 that are coupled by an example hinge 215 or other example adjustable connector 215 capable of positioning the light source 210 to project light onto the area 155 of the external display surface of media device 110.

Figure 3:
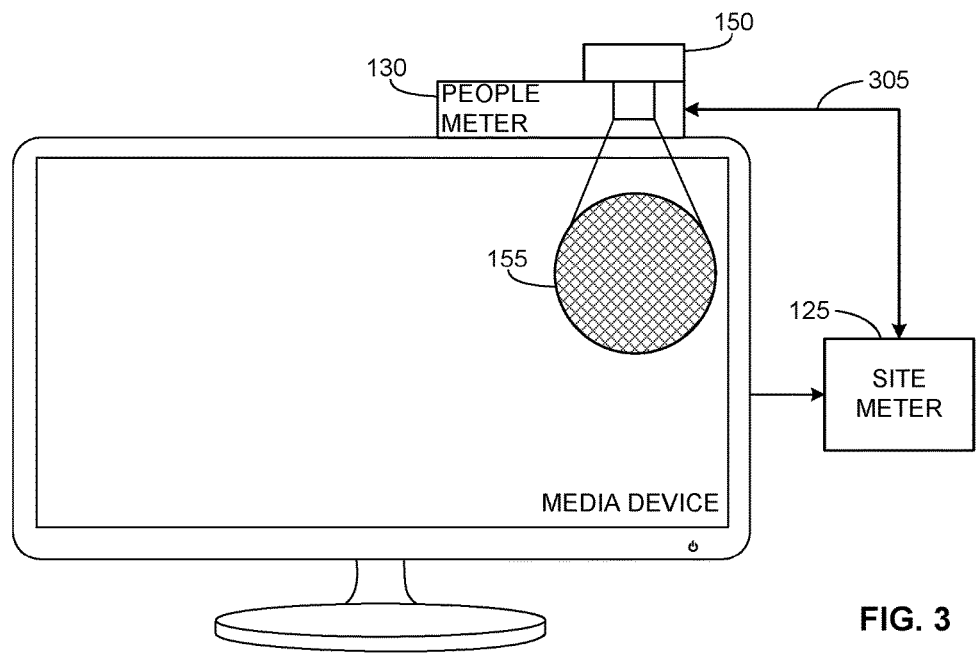
FIG. 3 is a block diagram of an example integrated version of the enhanced people meter of FIG. 1 in communication with the example site meter of FIG. 1 to perform audience measurement associated with an example media device.
Figure 4:
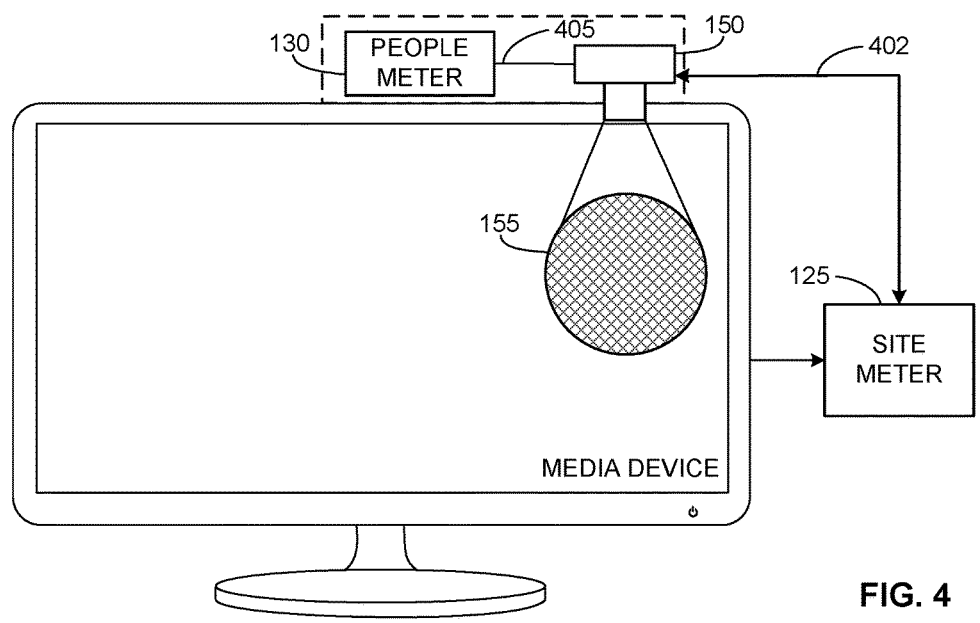
FIG. 4 is a block diagram of an example non-integrated version of the enhanced people meter of FIG. 1 in communication with the example site meter of FIG. 1 to perform audience measurement associated with an example media device.

As noted above, in some examples, the example light projector 150 is integrated with the enhanced people meter 130, whereas in other examples, the light projector 150 is separate from, but structured to be affixed or otherwise coupled to, the enhanced people meter 130. An example integrated version of the enhanced people meter 130 is illustrated in FIG. 3, whereas an example non-integrated version of the enhanced people meter is illustrated in FIG. 4. In the illustrated example of FIG. 3, the integrated version of the enhanced people meter 130 includes the light projector 150 in the same housing as the people meter 130. The example of FIG. 3 further illustrates the example enhanced people meter 130 in communication with the example site meter 125 via an example communication link 305 (e.g., corresponding to the example communication interface 145). In the illustrated example, the communication link 305 is implemented by a universal serial bus (USB) link. However, the communication link 305 may be implemented additionally or alternatively using any other type and/or number of wired link(s), any type(s) and/or number of wireless links (e.g., such as one or more Bluetooth connections, wireless local area networks (LANs), infrared (IR) links, etc.), etc., or combination thereof. In the illustrated example of FIG. 3, the enhanced people meter 130 uses the communication link 305 to receive one or more trigger commands, signals, etc., from the site meter 125, and to report to the site meter 125 people meter data, such as counts and identifiers of members of the audience 120 who provide user input(s) to register with the people meter 130 in response to audience prompting.

In the illustrated example of FIG. 4, the example light projector 150 is included in a housing that is separate from the housing of the example enhanced people meter 130. The example of FIG. 4 further illustrates the example enhanced people meter 130 in communication with the example site meter 125 via an example communication link 402 (e.g., corresponding to the example communication interface 145) between the site meter 125 and the light projector 150, and an example communication link 405 between the light projector 150 and the enhanced people meter 130. In the example of FIG. 4, the enhanced people meter 130 controls the light projector 150 via an example communication link 405, and uses the combination of the communication link 402 and communication link 405 to receive one or more trigger commands, signals, etc., from the site meter 125, and to report to the site meter 125 people meter data, such as counts and identifiers of members of the audience 120 who provide user input(s) to register with the people meter 130 in response to audience prompting. In the illustrated example, the communication links 402 and 405 are implemented by USB links. However, the communication links 402 and/or 405 may be implemented additionally or alternatively using any other type and/or number of wired link(s), any type(s) and/or number of wireless links (e.g., such as one or more Bluetooth connections, WLANs, IR links, etc.), etc., or combination thereof. In the illustrated example of FIG. 4, the enhanced people meter 130 uses the communication link 405 to transmit one or more commands, signals, etc., to control activation and deactivation of the light projector 150, to control characteristics (e.g., brightness, color, size, position, text content, pulsing, etc.) of the light emitted by the light projector 150, etc.

Figure 5:
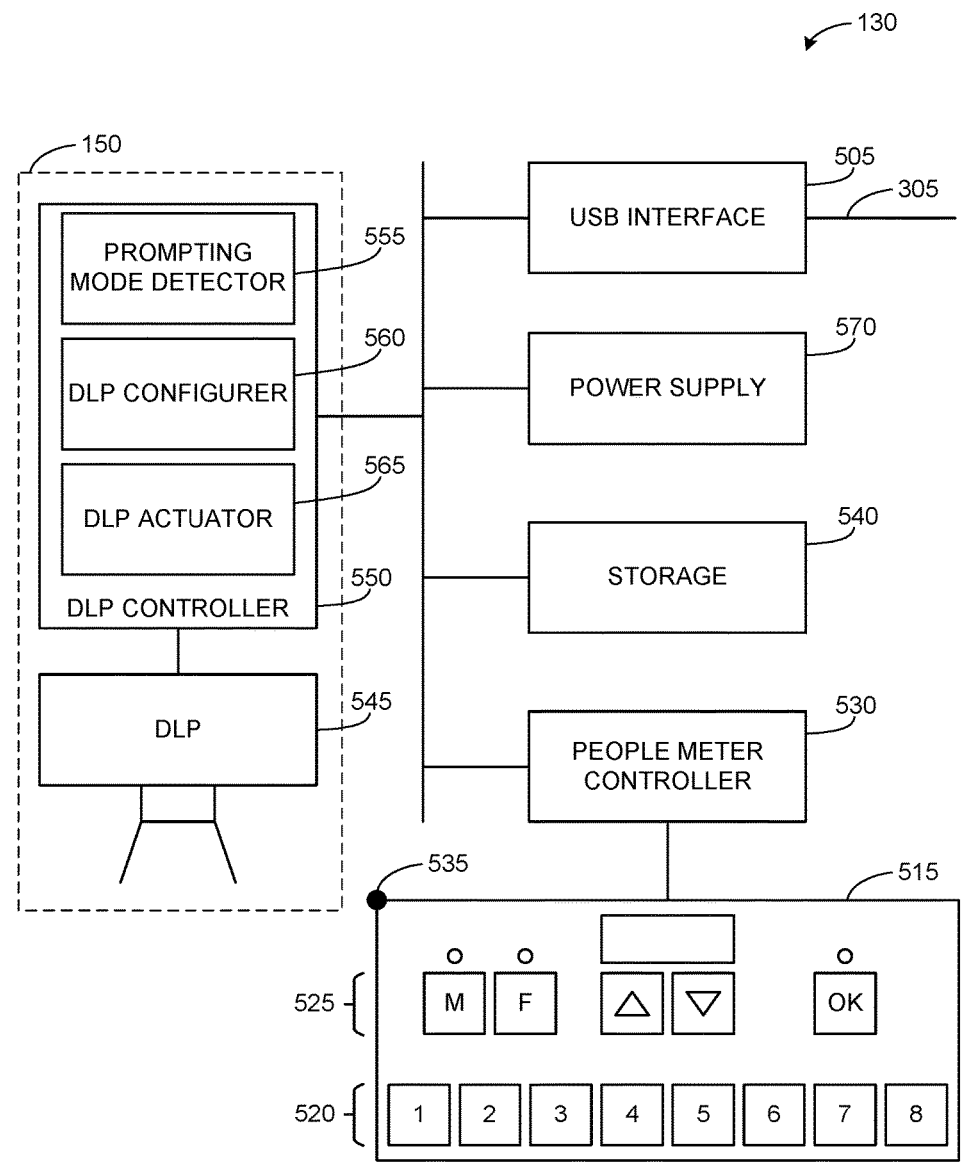
FIG. 5 is a block diagram of an example implementation of the integrated version of the enhanced people meter of FIG. 3.

A block diagram of an example implementation of an example integrated version of the enhanced people meter 130 of FIGS. 1, 2 and/or 3 is illustrated in FIG. 5. The example enhanced people meter 130 of FIG. 5 includes an example USB interface 505 to communicate with a site meter, such as the example site meter 125, via an example communication link, such as the example communication link 305. The enhanced people meter 130 of the illustrated example uses the USB interface 505 to receive one or more prompting triggers provided by the site meter 125 to control the prompting intervals during which the people meter 130 is to prompt an audience, such as the example audience 120, to actively provide audience identification information. In some examples, the prompting trigger is activated by the site meter 125 to cause audience prompting based on, for example, a pre-configured prompting interval corresponding to a pre-configured prompting frequency, a prompting interval specified during configuration of the enhanced people meter 130 and corresponding to a specified prompting frequency, and/or based on monitored characteristics of the media being presented by a media device, such as the example media device 110 (e.g., to cause prompting to occur upon detection of events, such as channel change events, media transition events (e.g., such as blank frames and/or other discontinuities between programs and commercials), audio muting/un-muting events, etc.), etc. In some examples, the site meter 125 provides different prompting triggers to cause the enhanced people meter 130 to operate in one or multiple different prompting modes, such as the normal and rude prompting modes described above and in further detail below.

The example enhanced people meter 130 of FIG. 5 also includes an example user interface 515 via which audience identification information can be obtained from the audience 120. In the illustrated example, the user interface 515 includes a set of audience keys 520, such that each audience key 520 is assigned to represent a respective possible member of the audience 120. Additional interface components 525, such as additional key(s), push buttons, displays, etc., are included in the user interface 515 to enable new/ guest audience members to be enrolled and associated with a particular audience key 520 of the enhanced people meter 130. For example, the additional interface components 525 may permit a new/guest audience member to input demographic information, such as gender, age, etc., to the enhanced people meter 130, after which the new/guest audience member is associated with one of the audience keys 520. The user interface 515 can also be implemented on a remote device, which is not depicted in FIG. 3, to enable the audience 120 to interact with the enhanced people meter 130 remotely.

The example enhanced people meter 130 of FIG. 3 includes an example people meter controller 530 to control the people meter 130 to prompt the audience 120 to enter audience identification information via the user interface 515. For example, the people meter controller 530 may initiate an audience prompt during a current prompting interval (e.g., as triggered by the prompting trigger(s)) by activating an example prompting indicator 535, which may correspond to a flashing light emitted by one or more lamps, LEDs, etc., a text message presented by an LCD screen, a sound emitted by one or more speakers, etc., or any combination thereof. In response to perceiving the activated prompting indicator 535, the members of the audience 120 press their respective audience key(s) 520 on the user interface 515 to indicate their presence in the audience 120. The results of the audience prompting, such as identifiers of the audience members who responded to the prompt, counts of the number of audience members over time, etc., are compiled by the people meter controller 530 of the illustrated example. The example people meter controller 530 further stores the compiled audience measurement information in an example storage 540 of the enhanced people meter 130 and reports the compiled audience measurement information to the site meter 125 via the example USB interface 505. The example storage 540 may be implemented by any type of storage and/or memory device, a database, etc., such as the mass storage device 928 and/or the volatile memory 914 included in the example processing system 900 of FIG. 9, which is described in greater detail below.

In the illustrated example of FIG. 5, the people meter controller 530 causes the enhanced people meter to operate in a normal prompting mode, a rude prompting mode or a quiet mode (in which the enhanced people meter 130 performs no prompting) based on one or more prompting triggers received via the USB interface 505 or generated autonomously (e.g., internally) by the people meter controller 530 (e.g., based on one or more clocks, timers, counters, etc.). For example the people meter controller 530 operates the enhanced people meter 130 in the quiet mode until being triggered to enter the normal prompting mode to begin a prompting interval. Then, when the people meter controller 530 is triggered (e.g., by the site meter 125) to begin a prompting interval, people meter controller 530 causes the enhanced people meter 130 to enter the normal prompting mode (e.g., autonomously and/or based on control command/signal received from the site meter 125) to perform normal audience prompting. In the normal prompting mode, the people meter controller 530 activates the prompting indicator 535 to operate according to a first (e.g., normal) configuration, as described above, to indicate that members of the audience 120 should provide user input(s) to register their presence with the people meter 130. In response to detecting one or more user inputs from the user interface 515 while operating in the normal prompting mode, the example people meter controller 530 (e.g., autonomously and/or as triggered by the example site meter 125) causes the enhanced people meter 130 to return to the quiet mode to end user prompting until the next prompting interval.

However, if no user input is detected for a first (e.g., normal mode) time period (e.g., which may be user-configurable, predetermined, etc.), the people meter controller 530 of the illustrated example is triggered to enter the rude prompting mode (e.g., autonomously based on expiration of an internal clock/timer, etc., and/or based on a control command/signal received from the site meter 125) to perform rude audience prompting. In the rude prompting mode, the people meter controller 530 activates the prompting indicator 535 to operate according to a second (e.g., rude) configuration, as described above, to prompt members of the audience 120 with greater urgency to provide user input(s) to register their presence with the people meter 130. In response to detecting one or more user inputs while operating in the rude prompting mode, or in response to expiration of a second (e.g., rude mode) time period, the example people meter controller 530 causes (e.g., autonomously and/or as triggered by the example site meter 125) the enhanced people meter 130 to return to the quiet mode to end user prompting until the next prompting interval.

To implement light projection for people metering as disclosed herein, the example enhanced people meter 130 of FIG. 5 includes an example digital light projector (DLP) 545 and an example DLP controller 550, which collectively implement the example light projector 150 of FIGS. 1, 2 and/or 3. The DLP 545 can be implemented by using any type of DLP technology and/or other digitally controlled light projector, light emitter, etc. The DLP controller 550 of the illustrated examples configures and activates the DLP 545 to project light onto an area 155 of the external display surface of the example media device 110 when the enhanced people meter 130 is operating in one or more prompting modes (e.g., as triggered by the example site meter 125 and/or controlled by the example people meter controller 530). As such, the example DLP controller 550 includes an example prompting mode detector 555 to detect the prompting mode of the enhanced people meter 130, as well as transitions between supported prompting modes. The example DLP controller 550 also includes an example DLP configurer 560 to configure a particular projection configuration for operating the DLP 545, and an example DLP actuator 565 to activate and deactivate the DLP 545 according to the projection configuration configured by the DLP configurer 560.

In some examples, the DLP controller 550 uses the DLP actuator to activate the DLP 545 to project light onto the area 155 of the external display surface of media device 110 according to a first projection configuration configured by the DLP configurer 560 in response to the prompting mode detector 555 detecting (e.g., autonomously and/or based on control command/signal received from the site meter 125 and/or people meter controller 530) that the enhanced people meter 130 is to enter the rude prompting mode, but not when the enhanced people meter 130 is to enter/operate in the normal operating mode or the quiet mode. In some such examples, in the first projection configuration, the DLP configurer 560 configures the DLP actuator 565 to activate the DLP 545 to project light, such as a white spot, a colored spot, a text message, etc., onto the area 155 of the external display surface of media device 110 according to a first projection pulsing pattern having a first projection pulsing frequency when the DLP 545 is initially activated. In some such examples, the DLP actuator 565 activates the DLP 545 according to a second projection configuration configured by the DLP configurer 560 (e.g., which is different from the first projection configuration) in response to the prompting mode detector 555 determining (e.g., autonomously based on an internal clock/time, and/or based on control command/signal received from the site meter 125 and/or people meter controller 530) a first projection time period has elapsed while the DLP 545 remains activated (e.g., when no user input has been detected during the first projection time period). In some examples, in the second projection configuration, the DLP configurer 560 configures the DLP actuator 565 to control the DLP 545 according to a second projection pulsing pattern (e.g., different from the first projection pulsing pattern) having a second projection pulsing frequency (e.g., which is higher than the first projection pulsing frequency). Additionally or alternatively, in some such examples, in the second projection configuration, the DLP configurer 560 configures the DLP actuator 565 to control the DLP 545 to at least one of change a color or change the projection area 155 of the light in response to determining (e.g., autonomously based on an internal clock/time, and/or based on control command/signal received from the site meter 125 and/or people meter controller 530) the first projection time period has elapsed while the light projector remains activated. Then, the DLP actuator 565 controls (e.g., deactivates) the DLP 545 to stop projecting light in response to, for example, the prompting mode detector 555 determining (e.g., autonomously based on an internal clock/timer, and/or based on a control command/signal received from the site meter 125 and/or people meter controller 530) that a second projection time period has expired, or determining (e.g., autonomously and/or based on control command/signal received from the site meter 125 and/or people meter controller 530) the people meter 130 has returned to the quiet mode (e.g., in response to a user input or expiration of the rude mode time period).

In some examples, the DLP configurer 560 configures the DLP actuator 565 to activate the DLP 545 to project light onto an area 155 of the external display surface of media device 110 in response to the prompting mode detector 555 detecting (e.g., autonomously and/or based on control command/signal received from the site meter 125 and/or people meter controller 530) that the enhanced people meter 130 is to enter any prompting mode, but not when the enhanced people meter is to enter/operate in the quiet mode. In some such examples, the DLP configurer 560 configures the DLP actuator 565 to activate the DLP 545 to project light onto the area 155 of the external display surface of media device 110 according to the first projection configuration described above in response to the prompting mode detector 555 detecting (e.g., autonomously and/or based on control command/signal received from the site meter 125 and/or the people meter controller 530) that the enhanced people meter 130 is to enter the normal prompting mode. In some such examples, the DLP configurer 560 configures the DLP actuator 565 to activate the DLP 545 to project light onto the area 155 of the external display surface of media device 110 according to the second projection configuration described above in response to the prompting mode detector 555 detecting (e.g., autonomously and/or based on control command/signal received from the site meter 125 and/or the people meter controller 530) that the enhanced people meter 130 is to enter the rude prompting mode. In some such examples, the DLP configurer 560 configures the DLP actuator 565 to control (e.g., deactivate) the DLP 545 to stop projecting light in response to the prompting mode detector 555 detecting (e.g., autonomously and/or based on control command/signal received from the site meter 125 and/or the people meter controller 530) that the enhanced people meter 130 is to enter the quiet mode.

The example enhanced people meter 130 of FIG. 5 further includes an example power supply 570 to power the meter components, including, but not limited to, the example USB interface 505, the example user interface 515, the example people meter controller 530, the example storage 540, the example DLP 545 and the example DLP controller 550.

Figure 6:
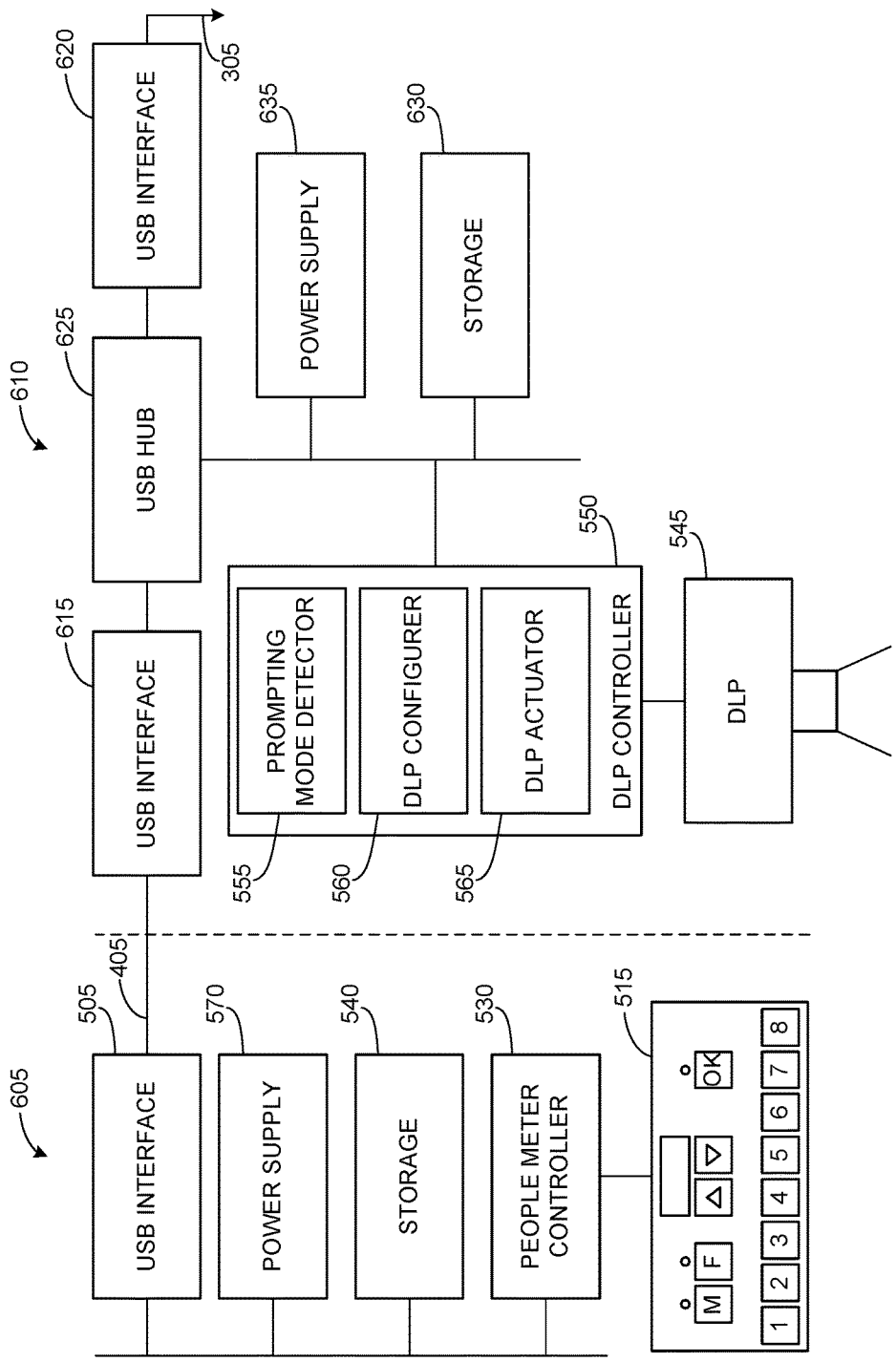
FIG. 6 is a block diagram of an example implementation of the non-integrated version of the enhanced people meter of FIG. 4.

A block diagram of an example implementation of an example non-integrated version of the enhanced people meter 130 of FIGS. 1, 2 and/or 4 is illustrated in FIG. 6. The example non-integrated version of the enhanced people meter 130 of FIG. 6 includes many elements in common with the example integrated version of the enhanced people meter 130 of FIG. 5. As such, like elements in FIGS. 5 and 6 are labeled with the same reference numerals. The detailed descriptions of these like elements are provided above in connection with the discussion of FIG. 5 and, in the interest of brevity, are not repeated in the discussion of FIG. 6.

For example, the example non-integrated version of the enhanced people meter 130 of FIG. 6 includes the example USB interface 505, the example user interface 515, the example people meter controller 530, the example storage 540 and the example power supply 570 described above in an example people meter housing 605. The example non-integrated version of the enhanced people meter 130 of FIG. 6 includes the example DLP 545 and the example DLP controller 550 described above in a separate example light projector housing 610. In the illustrated example of FIG. 6, the light projector housing 610 also includes first and second example USB interfaces 615 and 620, as well as an example USB hub 625, to allow the light projector housing 610 to be communicatively coupled between the people meter housing 605 and a site meter, such as the example site meter 125. For example, the first USB interface 615 of the light projector housing 610 can be coupled with the USB interface 505 of the people meter housing 605 to implement the example communication link 405, as shown. The second USB interface 620 of the light projector housing 610 can be coupled with the site meter 125 to implement the example communication link 305, as shown. In some examples, the light projector housing 610 includes its own example storage 630 and/or example power supply 635 to support autonomous operation (e.g., separate from the people meter housing 605).

While an example manner of implementing the enhanced people meter 130 is illustrated in FIGS. 1-6, one or more of the elements, processes and/or devices illustrated in FIGS. 1-6 may be combined, divided, re-arranged, omitted, eliminated and/or implemented in any other way. Further, the example light projector 150, the communication links 305 and/or 405, the example USB interfaces 505, 615 and/or 620, the example user interface 515, the example people meter controller 530, the example storages 540 and/or 630, the example DLP 545, the example DLP controller 550, the example prompting mode detector 555, the example DLP configurer 560, the example DLP actuator 565, the example power supplies 570 and/or 635, the example USB hub 625 and/or, more generally, the example enhanced people meter 130 of FIGS. 1-6 may be implemented by hardware, software, firmware and/or any combination of hardware, software and/or firmware. Thus, for example, any of the example light projector 150, the communication links 305 and/or 405, the example USB interfaces 505, 615 and/or 620, the example user interface 515, the example people meter controller 530, the example storages 540 and/or 630, the example DLP 545, the example DLP controller 550, the example prompting mode detector 555, the example DLP configurer 560, the example DLP actuator 565, the example power supplies 570 and/or 635, the example USB hub 625 and/or, more generally, the example enhanced people meter 130 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example enhanced people meter 130, the example light projector 150, the communication links 305 and/or 405, the example USB interfaces 505, 615 and/or 620, the example user interface 515, the example people meter controller 530, the example storages 540 and/or 630, the example DLP 545, the example DLP controller 550, the example prompting mode detector 555, the example DLP configurer 560, the example DLP actuator 565, the example power supplies 570 and/or 635, and/or the example USB hub 625 is/are hereby expressly defined to include a tangible computer readable storage device or storage disk such as a memory, a digital versatile disk (DVD), a compact disk (CD), a Blu-ray disk, etc. storing the software and/or firmware. Further still, the example enhanced people meter 130 may include one or more elements, processes and/or devices in addition to, or instead of, those illustrated in FIGS. 1-6, and/or may include more than one of any or all of the illustrated elements, processes and devices.

Figure 7:
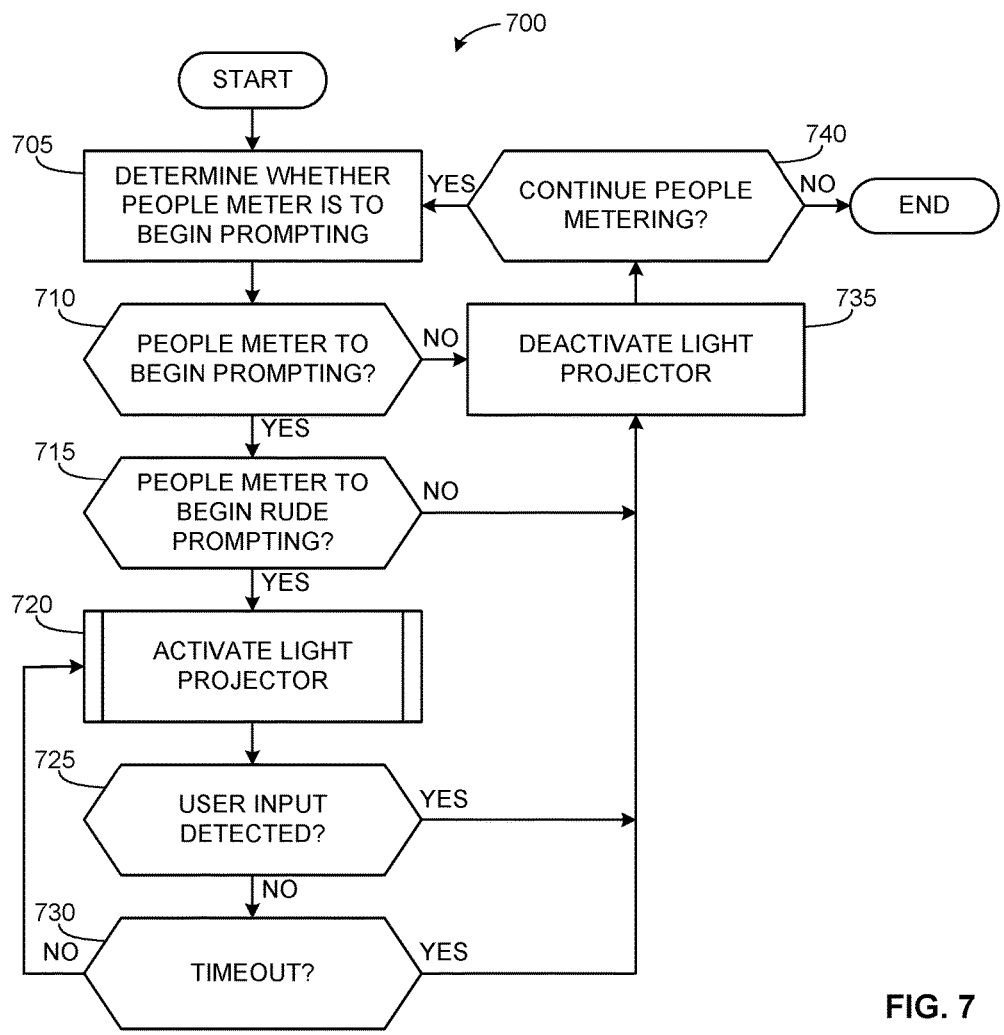
FIGS. 7-8 are flowcharts representative of example computer readable instructions that may be executed to implement the example enhanced people meters of FIGS. 1-5 and/or 6.
Figure 8:
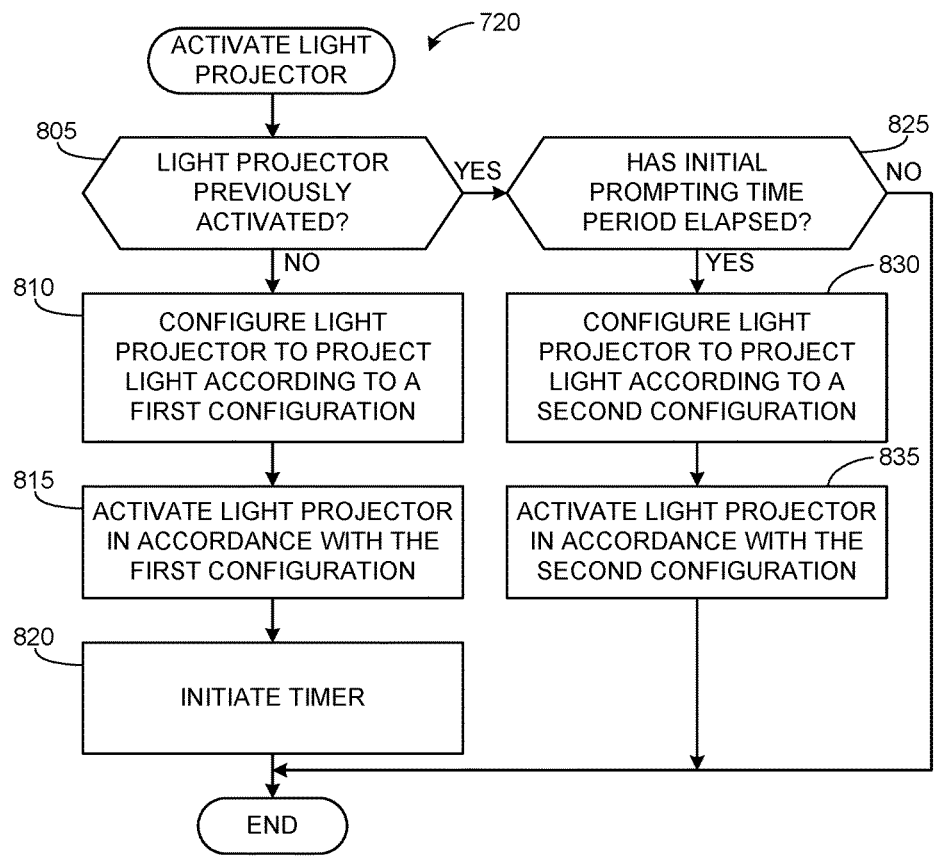

Flowcharts representative of example machine readable instructions for implementing the example enhanced people meter 130, the example light projector 150, the communication links 305 and/or 405, the example USB interfaces 505, 615 and/or 620, the example user interface 515, the example people meter controller 530, the example storages 540 and/or 630, the example DLP 545, the example DLP controller 550, the example prompting mode detector 555, the example DLP configurer 560, the example DLP actuator 565, the example power supplies 570 and/or 635, and/or the example USB hub 625 are shown in FIGS. 7-8. In these examples, the machine readable instructions comprise one or more programs for execution by a processor, such as the processor 912 shown in the example processor platform 900 discussed below in connection with FIG. 9. The one or more programs, or portion(s) thereof, may be embodied in software stored on a tangible computer readable storage medium such as a CD-ROM, a floppy disk, a hard drive, a digital versatile disk (DVD), a Blu-ray disk™, or a memory associated with the processor 912, but the entire program or programs and/or portions thereof could alternatively be executed by a device other than the processor 912 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 7-8, many other methods of implementing the example enhanced people meter 130, the example light projector 150, the communication links 305 and/or 405, the example USB interfaces 505, 615 and/or 620, the example user interface 515, the example people meter controller 530, the example storages 540 and/or 630, the example DLP 545, the example DLP controller 550, the example prompting mode detector 555, the example DLP configurer 560, the example DLP actuator 565, the example power supplies 570 and/or 635, and/or the example USB hub 625 may alternatively be used. For example, with reference to the flowcharts illustrated in FIGS. 7-8, the order of execution of the blocks may be changed, and/or some of the blocks described may be changed, eliminated, combined and/or subdivided into multiple blocks.

As mentioned above, the example processes of FIGS. 7-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-8 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 700 that may be executed to implement the example enhanced people meter 130 of FIGS. 1-6. With reference to the preceding figures and associated written descriptions, the example program 700 of FIG. 7 begins execution at block 705 at which the example DLP controller 550 of the enhanced people meter 130 determines whether the enhanced people meter has been triggered to enter a prompting mode to begin audience prompting, as described above. If the DLP controller 550 determines the enhanced people meter 130 is to begin prompting (block 710) and is to operate in a rude prompting mode (block 715), processing proceeds to block 720 at which the DLP controller 550 causes the example DLP 545 of the enhanced people meter 130 to project light onto the area 155 of the external display surface of media device 110 according to a given projection configuration, as described above. An example program to implement the processing at block 720 is illustrated in FIG. 8, which is described in further detail below.

After activating the DLP 545 at block 720, the DLP controller 550 determines, as described above, whether the example people meter controller 530 of the enhanced people meter 130 has received a user input via the example user interface 515 (block 725) or if a timeout period has expired (block 730). If no user input is received (block 725) and the timeout period has not expired (block 730), processing returns to block 720 at which the DLP controller 550 continues to activate the DLP 545 to project light onto the area 155 of the external display surface of media device 110. However, if a user input is received (block 725) or the timeout period has expired (block 730), processing proceeds to block 735 at which the DLP controller 550 deactivates the DLP 545, as described above. At block 740, if people metering is to continue (e.g., because the enhanced people meter 130 has not been placed in an off or standby mode), processing returns to block 705 and blocks subsequent thereto. Otherwise, execution of the example program 700 ends.

An example program 720P that may be executed to implement the processing at block 720 of FIG. 7 is illustrated in FIG. 8. With reference to the preceding figures and associated written descriptions, the example program 720P of FIG. 8 begins execution at block 805 at which the example DLP controller 550 of the example enhanced people meter 130 determines whether the example DLP 545 of the enhanced people meter 130 was previously activated (e.g., and, thus, the enhanced people meter 130 has entered the rude prompting mode). If the DLP 545 was not previously activated (block 805), processing proceeds to block 810 at which the example DLP configurer 560 of the DLP controller 550 of the enhanced people meter 130 configures the DLP 545 to project light onto the area 155 of the external display surface of media device 110 according to the first projection configuration described above. At block 815, the example DLP configurer 560 causes the example DLP actuator 565 of the DLP controller 550 of the enhanced people meter 130 to activate the DLP 545 in accordance with the first projection configuration, as described above. At block 820, the DLP controller 550 activates a timer to track whether the DLP 545 has been activated according to the first projection configuration for the time period described above. Execution of the example program 720P then ends.

However, if the DLP 545 was determined at block 805 to have been previously activated, processing proceeds to block 825 at which the DLP controller 550 determines, as described above, whether the time period for operating according to the first projection mode has expired. If the time period has not expired (block 825), then the DLP actuator 565 of the DLP controller 550 continues to activate the DLP 545 in accordance with the first projection configuration, as described above. However, if the time period has expired (block 825), then processing proceeds to block 830 at which the DLP configurer 560 of the DLP controller 550 configures the DLP 545 to project light onto the area 155 of the external display surface of media device 110 according to the second projection configuration described above. At block 835, the DLP configurer 560 causes the DLP actuator 565 of the DLP controller 550 to activate the DLP 545 in accordance with the second projection configuration, as described above. Execution of the example program 720P then ends.

Figure 9:
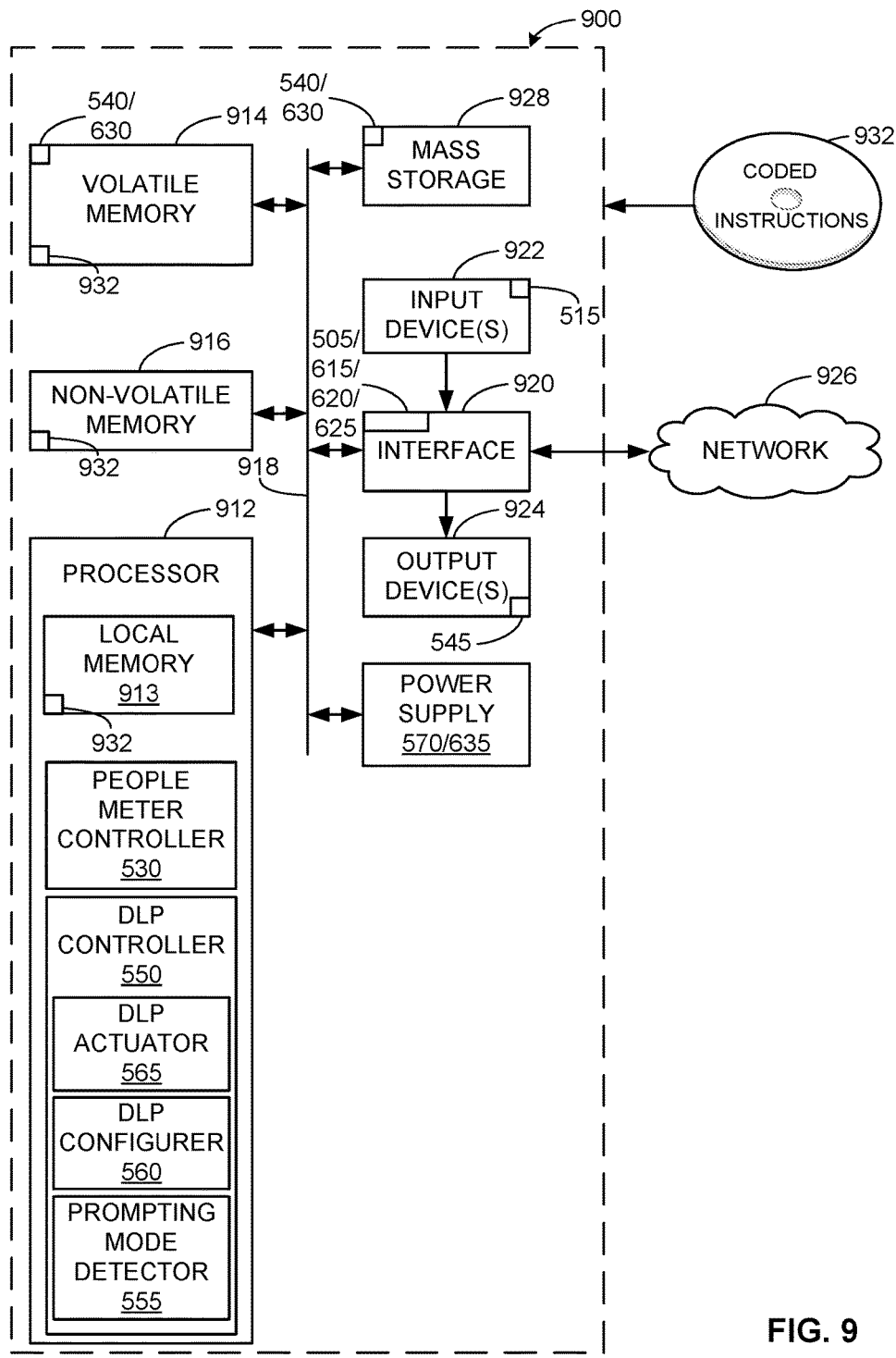
FIG. 9 is a block diagram of an example processor platform structured to execute the example computer readable instructions of FIGS. 7 and/or 8 to implement the example enhanced people meters of FIGS. 1-5 and/or 6.

FIG. 9 is a block diagram of an example processor platform 900 structured to execute the instructions of FIGS. 7 and/or 8 to implement the example enhanced people meter 130 of FIGS. 1-6. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device. In some examples, when implementing the example integrated version of the enhanced people meter 130 of FIG. 5, one instance of the example processor system 900 is used to implement the enhanced people meter 130. In some examples, when implementing the example non-integrated version of the enhanced people meter 130 of FIG. 6, multiple instances of systems similar to the example processor system 900 are used with, for example, one system being included in example people meter housing 605 to implement people metering functionality, as described above, and another system being included in the example light projector housing 610 to implement light projection functionality, as described above.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In some examples, when implementing the example integrated version of the enhanced people meter 130 of FIG. 5, the example processor 912 is configured via example instructions 932, which include the example instructions of FIGS. 7 and/or 8, to implement the example people meter controller 530, the example DLP controller 550, the example prompting mode detector 555, the example DLP configurer 560 and the example DLP actuator 565. In some examples, when implementing the example non-integrated version of the enhanced people meter 130 of FIG. 6, a processor similar to the example processor 912 is included in the example people meter housing 605 and configured via instructions similar to at least some of the example instructions 932 to implement the example people meter controller 530, whereas another processor similar to the example processor 912 is included in the example light projector housing 610 and configured via instructions similar to at least some of the example instructions 932 to implement the example DLP controller 550, the example prompting mode detector 555, the example DLP configurer 560 and the example DLP actuator 565.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914 and/or 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface. In some examples, when implementing the example integrated version of the enhanced people meter 130 of FIG. 5, the example interface circuit 920 implements the example USB interface 505. In some examples, when implementing the example non-integrated version of the enhanced people meter 130 of FIG. 6, an interface circuit similar to the example interface circuit 920 is included in the example people meter housing 605 to implement the example USB interface 505, and another interface circuit similar to the example interface circuit 920 is included in the example light projector housing 610 to implement the first and second example USB interfaces 615 and 620, and the example USB hub 625.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition. In some examples, the input devices 922 used to implement the example integrated version of the enhanced people meter 130 of FIG. 5 or included in the example people meter housing 605 of the example non-integrated version of the enhanced people meter 130 of FIG. 6 also implements the example user interface 515.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor. In some examples, the output devices 924 used to implement the example integrated version of the enhanced people meter 130 of FIG. 5 or included in the example light projector housing 610 of the example non-integrated version of the enhanced people meter 130 of FIG. 6 also implements the example DLP 545.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID (redundant array of independent disks) systems, and digital versatile disk (DVD) drives. In some examples, the mass storage device 928 and/or the volatile memory 914 used to implement the example integrated version of the enhanced people meter 130 of FIG. 5 or included in the example people meter housing 605 of the example non-integrated version of the enhanced people meter 130 of FIG. 6 also implements the example storage 540. In some examples, the mass storage device 928 and/or the volatile memory 914 used to implement the example light projector housing 610 of the example non-integrated version of the enhanced people meter 130 of FIG. 6 also implements the example storage 630.

In some examples, the processor system 900 used to implement the example integrated version of the enhanced people meter 130 of FIG. 5 or included in the example people meter housing 605 of the example non-integrated version of the enhanced people meter 130 of FIG. 6 also includes the example power supply 570, as shown. In some examples, the processor system 900 used to implement the example light projector housing 610 of the example non-integrated version of the enhanced people meter 130 of FIG. 6 also includes the example power supply 635, as shown.

Coded instructions 932 corresponding to the instructions of FIGS. 7 and/or 8 may be stored in the mass storage device 928, in the volatile memory 914, in the non-volatile memory 916, in the local memory 913 and/or on a removable tangible computer readable storage medium, such as a CD or DVD 932.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

It is noted that this patent claims priority from Indian Patent Application Serial Number 201611039061, which was filed on Nov. 16, 2016, and is hereby incorporated by reference in its entirety.

What is claimed is:

1. A meter comprising:
a user interface to emit prompts for user input;
a light projector to project light onto a surface;
a timing source; and
a controller to:
  determine whether the meter is to enter a first prompting mode, the meter being able to operate in at least one of a quiet mode, the first prompting mode, or a second prompting mode different from the first prompting mode;
  activate the light projector to project the light according to a first pulsing pattern having a first frequency in response to determining the meter is to enter the first prompting mode;
  determine, based on the timing source, whether a first time period has elapsed while the light projector has been activated, the meter to enter the quiet mode in response to detection of a user input while the meter is operating in at least one of the first prompting mode or the second prompting mode, and the meter to enter the first prompting mode when no user input is detected after the meter has operated in the second prompting mode for a second time period;
  control the light projector to project the light according to a second pulsing pattern having a second pulsing frequency different than the first pulsing frequency in response to the first time period having elapsed while the light projector has been activated; and
  deactivate the light projector in response to determining the meter is to exit the first prompting mode.

2. The meter of claim 1, wherein the user interface is to emit a first type of prompt during the first prompting mode, the user interface is to emit a second type of prompt during the second prompting mode, the user interface is to perform no prompting during the quiet mode, and the controller is further to activate the light projector while the meter is operating in the first prompting mode, and not activate the light projector while the meter is operating in the second prompting mode or the quiet mode.

3. The meter of claim 1, wherein the surface corresponds to an external surface of a display screen of a media device, and the light projector, when activated, is to project at least one of a white spot, a colored spot or a text message on the external surface of the display screen of the media device.

4. The meter of claim 1, wherein the controller is further to control the light projector to at least one of change a color or change a projection area of the light in response to the first time period having elapsed.

5. A metering method comprising:

determining, by executing an instruction with a processor, whether a meter is to enter a first prompting mode;

in response to determining the meter is to enter the first prompting mode, activating, by executing an instruction with the processor, a light projector to project light according to a first pulsing pattern having a first frequency onto a surface, the meter being able to operate in at least one of a quiet mode, the first prompting mode, or a second prompting mode different from the first prompting mode;

determining, based on a timing source, whether a first time period has elapsed while the light projector has been activated, the meter to enter the quiet mode in response to detection of a user input while the meter is operating in at least one of the first prompting mode or the second prompting mode, and the meter to enter the first prompting mode when no user input is detected after the meter has operated in the second prompting mode for a second time period;

controlling, by executing an instruction with the processor, the light projector to project the light according to a second pulsing pattern having a second pulsing frequency different than the first pulsing frequency in response to determining the first time period elapsed while the light projector has been activated; and after the light projector is activated, deactivating, by executing an instruction with the processor, the light projector in response to determining the meter is to exit the first prompting mode.

6. The method of claim 5, wherein the meter is to emit a first type of prompt while operating in the first prompting mode, the meter is to emit a second type of prompt while operating in the second prompting mode, the meter is to perform no prompting while operating in the quiet mode, and further including activating the light projector while the meter is operating in the first prompting mode, and not activating the light projector while the meter is operating in the second prompting mode or the quiet mode.

7. The method of claim 5, wherein the surface corresponds to an external surface of a display screen of a media device, and the light projector, when activated, is to project at least one of a white spot, a colored spot or a text message on the external surface of the display screen of the media device.

8. The method of claim 5, further including controlling the light projector to at least one of change a color or change a projection area of the light in response to determining the first time period has elapsed.

9. A tangible computer readable storage medium comprising computer readable instructions which, when executed, cause a processor to at least:

determine whether a meter is to enter a first prompting mode, the meter being able to operate in at least one of a quiet mode, the first prompting mode, or a second prompting mode different from the first prompting mode;

in response to determining the meter is to enter the first prompting mode, activate a light projector to project light according to a first pulsing pattern having a first frequency onto a surface;

determine, based on a timing source, whether a first time period has elapsed while the light projector has been activated, the meter to enter the quiet mode in response to detection of a user input while the meter is operating in at least one of the first prompting mode or the second prompting mode, and the meter to enter the first prompting mode when no user input is detected after the meter has operated in the second prompting mode for a second time period;

control the light projector to project the light according to a second pulsing pattern having a second pulsing frequency different than the first pulsing frequency in response to the first time period having elapsed while the light projector has been activated; and after the light projector is activated, deactivate the light projector in response to determining the meter is to exit the first prompting mode.

10. The tangible computer readable storage medium of claim 9, wherein the meter is to emit a first type of prompt while operating in the first prompting mode, the meter is to emit a second type of prompt while operating in the second prompting mode, the meter is to perform no prompting while operating in the quiet mode, and the instructions, when executed, further cause the processor to activate the light projector while the meter is operating in the first prompting mode, and not activate the light projector while the meter is operating in the second prompting mode or the quiet mode.

11. The tangible computer readable storage medium of claim 9, wherein the surface corresponds to an external surface of a display screen of a media device, and the light projector, when activated, is to project at least one of a white spot, a colored spot or a text message on the external surface of the display screen of the media device.

12. The tangible computer readable storage medium of claim 9, wherein the computer readable instructions, when executed, further cause the processor to control the light projector to at least one of change a color or change a projection area of the light in response to the first time period having elapsed.

13. The meter of claim 1, wherein the second pulsing frequency is higher than the first pulsing frequency.

14. The method of claim 5, wherein the second pulsing frequency is higher than the first pulsing frequency.

15. The tangible computer readable storage medium of claim 9, wherein the second pulsing frequency is higher than the first pulsing frequency.

16. The meter of claim 1, wherein the controller is further to deactivate the light projector in response to a third time period having expired.

17. The method of claim 5, further including deactivating the light projector in response to a third time period having expired.

18. The tangible computer readable storage medium of claim 9, wherein the instructions, when executed, further cause the processor to deactivate the light projector in response to a third time period having expired.

* * * * *